Patented June 11, 1946

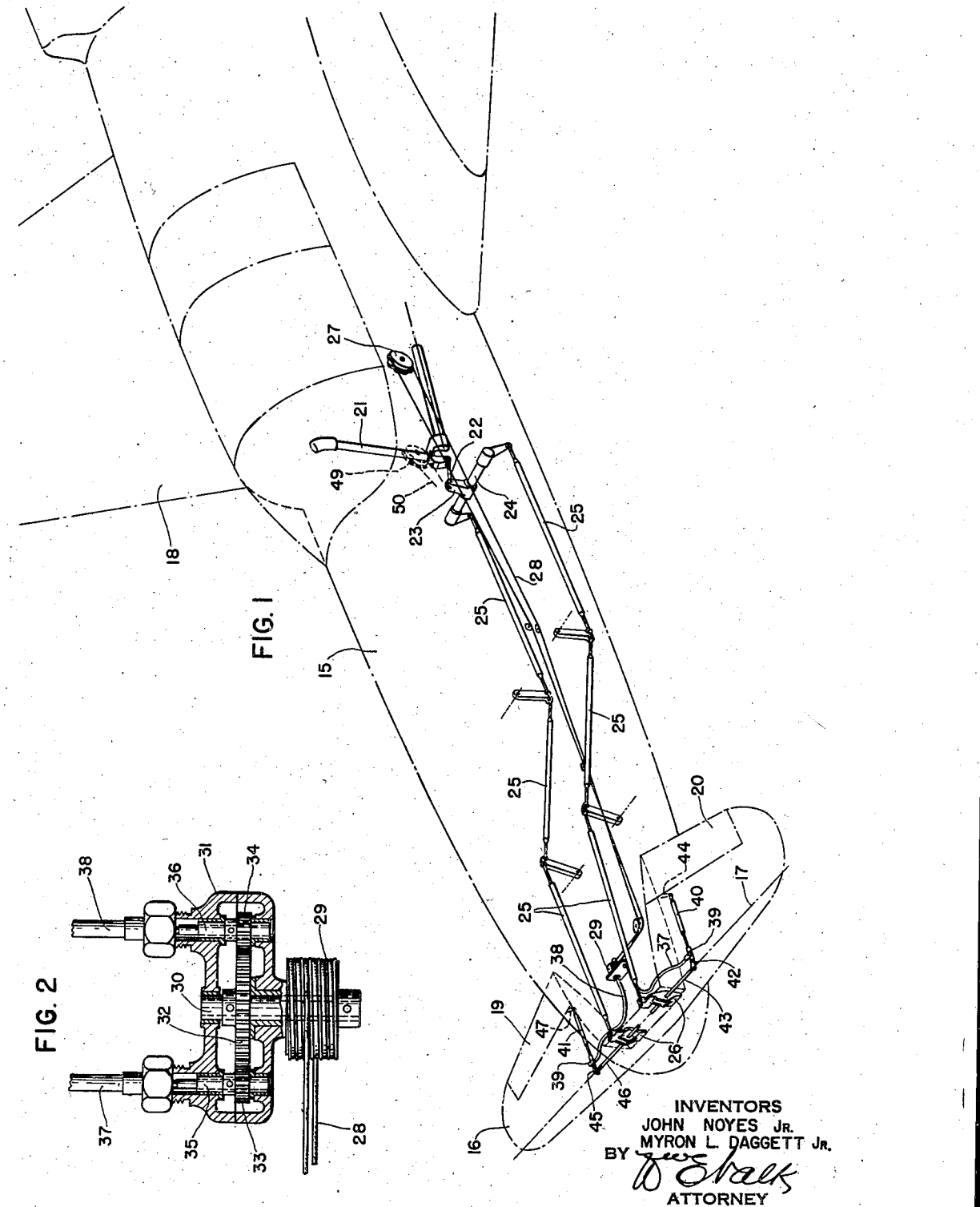

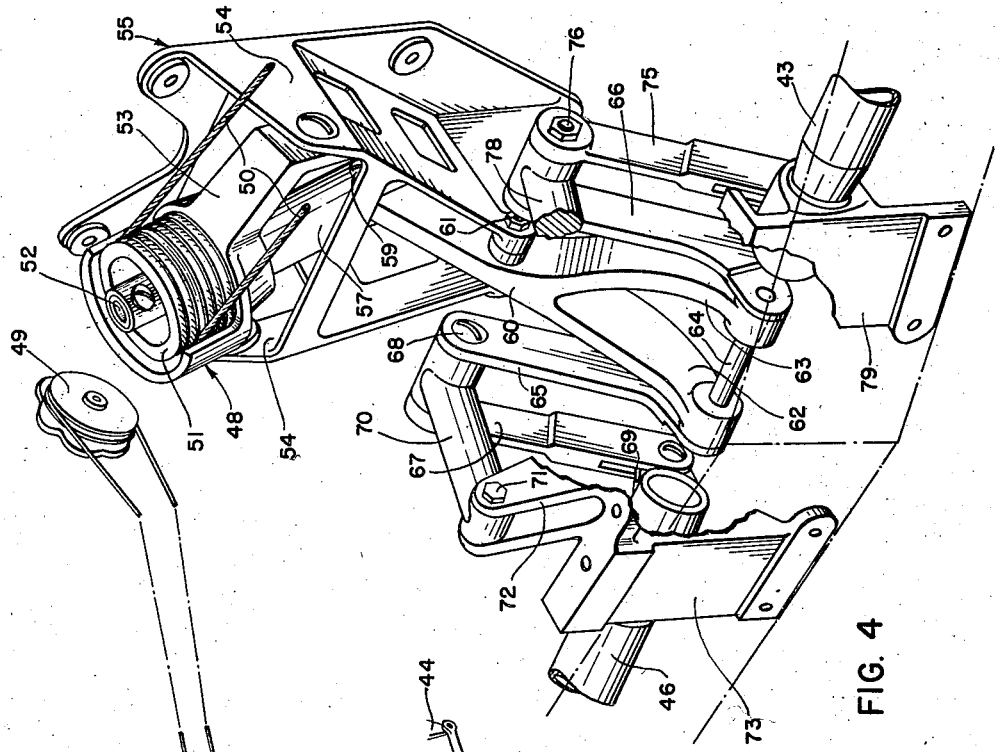

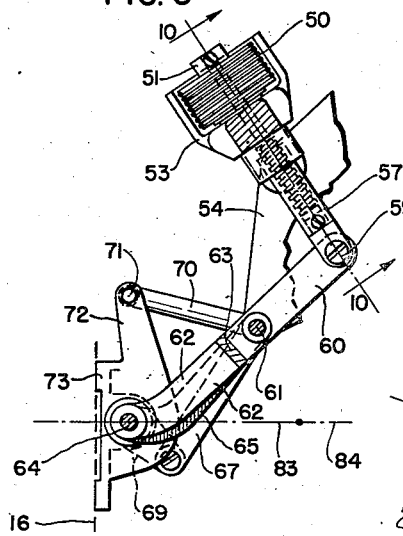
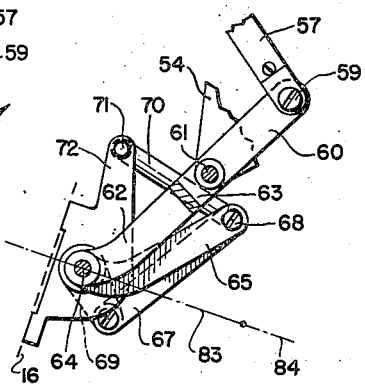
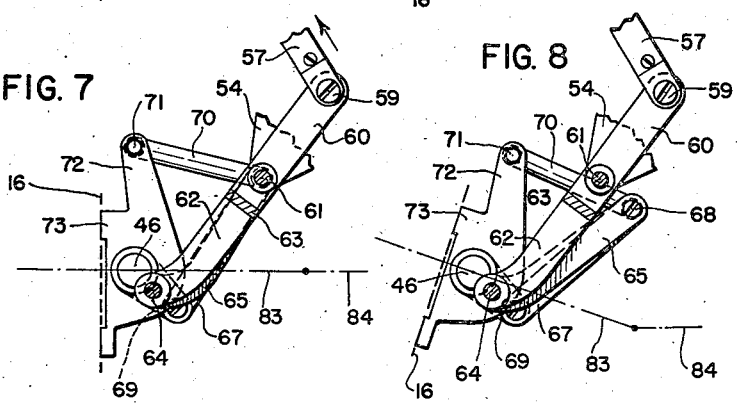
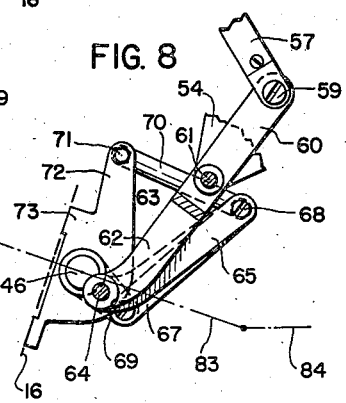
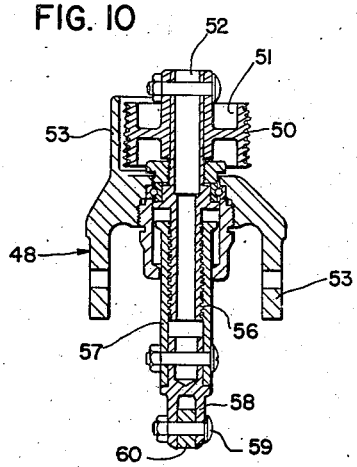
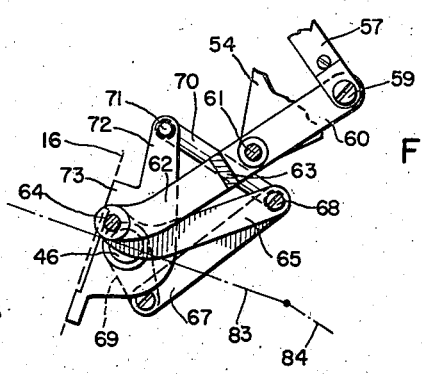
INVENTORS
JOHN NOYES Jr.
MYRON L. DAGGETT Jr.

2,401,790

UNITED STATES PATENT OFFICE 2,401,790

AIRPLANE CONTROL SURFACE

John Noyes, Jr., and Myron L. Daggett, Jr., University City, Mo., assignors to Curtiss-Wright Corporation, a corporation of Delaware Application January 19, 1944, Serial No. 519,072

10 Claims. (Cl. 244—82)

This invention relates to airplane control surfaces of the type characterized by cooperating main and auxiliary airfoils, being concerned more particularly with a mechanism which is responsive to the movement of the main airfoil to effect a differential movement of the auxiliary airfoil, or airfoils.

One object of the invention is to provide a mechanism of the character generally described which may be adjusted, as occasion may require, to cause the auxiliary airfoil, or airfoils, to lag, lead, or move at the same rate as the main airfoil.

A further object is to provide a mechanism which is so designed that, within limits, the degree of relative movement between the main and auxiliary airfoils may, with respect to a predetermined movement of the main airfoil, be varied at will.

A still further object is to provide a mechanism which will permit the auxiliary airfoil, or airfoils, to be availed of for trimming purposes and which may be adjusted to effect automatically the desired relative movement between the main and auxiliary airfoils for any trim setting of the latter.

A still further object is to provide a mechanism which is adaptable for use in connection with a control surface so designed and mounted that it automatically seeks and, under normal condition of rectilinear flight, tends to remain in a neutral or balanced position with respect to the direction of air flow.

A still further object is a novel design and arrangement of the parts of the mechanism, whereby to obtain simplicity in construction and dependability in operation.

The invention is illustrated in the accompanying drawings, in which:

Figure 1 is a perspective view, in phantom, of an airplane having a control surface wherein auxiliary airfoils are controlled by a differential mechanism embodying the features of the invention.

Figure 2 is an enlarged sectional view through the housing of the trim gear of the auxiliary airfoils.

Figure 3 is a perspective view of the cooperating control mechanisms for the main and auxiliary airfoils.

Figure 4 is an enlarged perspective view of the control mechanism for the auxiliary airfoils.

Figures 5 through 9, inclusive, are similar sectional views through the control mechanism for the auxiliary airfoils; Figure 5 showing the relation of the parts when the main and auxiliary airfoils occupy neutral positions and the parts are adjusted so that the airfoils may be controlled without relative movement between them; Figure 6 showing the relation of the parts and the relation of the auxiliary airfoils when, without further adjustment, the main airfoil is moved from the neutral position to a positive angle of attack; Figure 7 showing the relation of the parts when the main and auxiliary airfoils occupy neutral positions and the parts of the control mechanism are adjusted so that the auxiliary airfoils will lag the main airfoil when the latter is moved; Figure 8 showing the relation of the parts and the relation of the auxiliary airfoils when, without further adjustment, the main airfoil is moved to a positive angle of attack; and Figure 9 showing the relation of the parts and the relation of the auxiliary airfoils when the main airfoil is moved to a positive angle of attack and the parts of the control mechanism are adjusted so that the auxiliary airfoils lead the main airfoil.

Figure 10 is a detail section taken along line 10—10 of Figure 5.

The invention is illustrated, by way of example, in connection with an airplane which forms the subject matter of the co-pending application of Carl W. Scott and Willis L. Wells, Serial No. 509,318, filed November 6, 1943, the said airplane, which is of the so-called "pusher" type, being sufficiently indicated for the purpose in view by a showing of the forward section and mid-section of the fuselage 15. A horizontal control surface, or nose elevator 16, is carried by the nose section of the fuselage and is mounted for pivotal movement about a spanwise axis 17 which is located within the leading edge of the elevator. As the airplane is designed so that all of the lifting and stabilizing forces are produced by the main wing 18, the nose elevator will not normally be subjected to a load and may occupy a neutral position which it seeks automatically and in which it tends to remain. The principal function of the nose elevator when employed in connection with the airplane illustrated is to impart a high degree of maneuverability to the airplane by rendering it highly responsive to the control stick, the location of the elevator a substantial distance ahead of a main wing which produces all lifting and stabilizing forces contributing in a large measure to the attainment of the results sought. Auxiliary airfoils 19 and 20 are mounted at the trailing edge of the main airfoil, being connected to the latter so that they may be angularly adjusted.

The symmetrical halves of the nose elevator are connected for unisonous, angular movement about the axis 17, being supported at opposite sides of the fuselage by suitable bearings located wholly within the nose section. As illustrated, the nose elevator is connected to a control stick 21 and is adapted to be operated, as in a conventional airplane, by fore and aft movements of the control stick. To this end, the latter is connected by a link 22 to an arm 23 on a rock shaft 24. Cranks which are carried at the opposite ends of the latter are connected by parallel series of push-pull rods 25 to brackets 26 which are located within the fuselage and which are suitably secured to the elevator structure.

The auxiliary airfoils 19 and 20 are intended primarily for trimming purposes. For example, if the airplane is for any reason nose heavy, the auxiliary airfoils may be adjusted to increase the lifting force produced by the elevator. Likewise a tail-heavy condition may be compensated by an opposite setting of the auxiliary airfoils. The latter may be manually adjusted for the purpose described by a control device 27 which is connected by a cable 28 to a winding drum 29. A shaft 30 (Figure 2) which carries the drum 29 is mounted in a housing 31 which is mounted upon a suitable support, the said housing accommodating a driving gear 32 which is fixed to the shaft 30 and driven gears 33 and 34 which mesh with the driving gear. The driven gears are fixed to shafts 35 and 36, respectively, one of which is connected to the power-transmitting element of flexible cable 37 and the other of which is connected to the power-transmitting element of a similar cable 38. The power-transmitting elements of the cables 37 and 38 are connected to the driving members of gear actuators 39 (Figure 3), the driven members of said actuators constituting parts of links 40 and 41 and being operative to shorten and lengthen the said links in any suitable manner. The link 40 is connected at its forward end to a crank 42 on the outer end of a torque tube 43 and at its rearward end to a lever arm 44 on the auxiliary airfoil 20. The link 41 similarly connects a crank 45 on a torque tube 46 to a lever arm 47 on the auxiliary airfoil 19, it being noted, as indicated in Figure 1, that the axes of the torque tubes 43 and 46 are in alignment and are coincident with the axis of the main airfoil of the elevator. When the torque tubes 43 and 46 are held against angular movement, the control device 27 may be adjusted to elevate or lower the auxiliary airfoils to give them any desired predetermined setting with respect to the main airfoil of the elevator.

The invention also contemplates the use of the auxiliary airfoils of the nose elevator, apart from their use for trimming purposes, and independently of such function, for automatically increasing and decreasing the load upon the control stick as circumstances may require, this being accomplished by a differential mechanism which is automatically operative in response to the movement of the main airfoil to cause the auxiliary airfoils to move faster or slower than, or at the same rate as, the main airfoil of the elevator and thereby to lead or lag the main airfoil or accompany it without relative movement.

A differential mechanism for actuating the auxiliary airfoils in the manner described is indicated generally at 48 (Figures 3 and 4). The said mechanism, as illustrated, may be adjusted by a control device 49 to effect any desired movement of the auxiliary airfoils 19 and 20 with relation to a predetermined movement of the main airfoil. The control device 49 is mounted within convenient access of the pilot and is connected by a cable 50 to a drum 51. The latter is carried by the upper end of a shaft 52 which is journaled in a bearing support 53, the said support being pivotally mounted between the side flanges 54 of a bracket 55 which is adapted to be mounted upon a suitable stationary support. The lower end of the shaft 52 is externally threaded as indicated at 56 (Figure 10) and screws into the upper end of an internally threaded connecting rod 57, the lower end of the latter carrying a clevis 58 which is connected by a pin 59 to the upper end of a lever arm 60 (Figure 4). The said arm is mounted for rocking movement upon a transverse shaft 61 between inwardly converging portions of the flanges 54 of the bracket 55 and at its lower end is forked to provide legs 62 and 63. A pivot shaft 64 which is carried between the legs 62 and 63 is formed with extensions to which links 65 and 66 are pivotally connected. The upper end of the link 65 and the upper end of a companion link 67 are connected by a pin 68, the lower end of the link 67 being connected to a crank 69 on the inner end of the torque tube 46. A rod 70 which is connected at one end to the pin 68 is connected at the opposite end to a pin 71 which is mounted between the upper ends of a pair of arms 72. The said arms are carried by a bearing member 73 which is fixed to, and hence which is movable with, the elevator. Adjacent its inner end the torque tube 46 is formed with a journal 74 (Figure 3) which is accommodated in the bearing member 73. In a like manner the upper end of the link 66 and a link 75 are connected by a pin 76, the lower end of the link 75 being connected to a crank 77 (Figure 3) which is carried by the inner end of the torque tube 43, while one end of a rod 78 is connected to the pin 76 and the opposite end is connected to a bearing member 79. The latter is similar to the bearing member 73 and is adapted to accommodate a journal 80 which is formed at the inner end of the torque tube 43. Adjacent their outer ends the torque tubes 43 and 46 are supported in bearings 81, it being noted in this connection that the brackets 26 which are carried by the elevator are formed with openings through which the torque tubes 43 and 46 pass and are also formed with suitable openings for bearing supports 82 in which the inner ends of the torque tubes are supported for angular movement.

From the foregoing it will be apparent that any movement of the elevator in response to the control stick is transmitted through the differential mechanism to the torque tubes 43 and 46, the attendant movement of the auxiliary airfoils 19 and 20 being dependent upon the setting of the said mechanism as predetermined by the control device 49 and being independent of any setting of the auxiliary airfoils which may have been made for trimming purposes. In this connection it will be noted that the control device 49 may be rotated in opposite directions to cause axial displacement of the connecting rod 57 in opposite directions. The lever arm 60 may thus be rocked upon its pivot to vary the position of the shaft 64 and hence the position of the axis about which the links 65 and 66 may be caused to turn in response to the movement of the main airfoil of the elevator.

When no relative movement between the main and auxiliary airfoils of the elevator is desired, the differential mechanism is adjusted in the manner described so that the axis of the pivot shaft 64 is aligned, as illustrated in Figure 5, with the axis about which the main airfoil turns, the main airfoil being indicated in this and in the similar views by a chord line 83 while the auxiliary airfoils are indicated by a common chord line 84. Under such conditions the connecting rod 70 causes the links 65 and 67 to move as a unit about an axis which is coincident with the axis about which the main airfoil turns. Hence the auxiliary airfoils turn with the main airfoil without relative movement as shown in Figure 6.

The auxiliary airfoils may, if desired, be caused to lag the main airfoil. This may be accomplished by adjusting the control device 49 to move the pivot shaft 64 in the direction of the axis of the pivotal connection between the link 67 and crank 69, as indicated in Figure 7, the further the pivot shaft is moved in such direction the less will be the movement of the auxiliary airfoils with respect to a predetermined movement of the main airfoil. When the pivot shaft is moved in the direction indicated, its axis will be moved closer to the axis of the pivotal connection between the link 67 and the crank 69. Hence the angular movement of the torque tube 46, and therefore of the auxiliary airfoil 19 will, as indicated in Figure 8, be less than the angular movement of the main airfoil of the elevator. In other words, the torque tube will be rotated at a slower rate than the main airfoil and hence the net angular displacement of the auxiliary airfoil will be less than that of the main airfoil. It is immaterial in which direction the main airfoil is moved by the control stick, the auxiliary airfoil will always lag behind it.

To cause the auxiliary airfoil to lead the main airfoil it is only necessary to adjust the differential control device 49 to move the pivot shaft 64 in the opposite direction so that its axis is located ahead of the axis of the main airfoil, as indicated in Figure 9. When the pivot shaft is moved to such a position and the main airfoil is moved, the links 65 and 67 will cause the auxiliary airfoil to lead the main airfoil in both up and down movements of the latter.

From the foregoing it will be apparent that the auxiliary airfoils 19 and 20 are controlled by similar linkages and that the said linkages are individually driven, one by the connecting rod 70 and the other by the connecting rod 78. The two auxiliary airfoils, therefore, are moved simultaneously, in the same direction and to the same degree by the differential mechanism. Referring to the linkage for the auxiliary airfoil 19, it will be noted that the connecting rod 70 is displaced for any movement of the main airfoil a distance corresponding to such movement. The links 65 and 67 transmit the movement of the connecting rod 70 through the crank 69 to the torque tube 46, and hence to the auxiliary airfoil 19. In transmitting such movement to the torque tube 46, the links 65 and 67 move as a unit, without substantial relative movement between them, about the pivot shaft 64. As the links 65 and 67 rotate about the pivot shaft and as the movement of the two links is transmitted to the crank 69, it will be apparent that the magnitude of such movement (for any predetermined movement of the main airfoil) will decrease as the pivot shaft is moved toward the axis of the pivotal connection between the link 67 and the crank 69 and increase as the pivot shaft is moved away from the axis of said pivotal connection, the rate of angular movement of the torque tube 46 being substantially the same as that of the main airfoil of the elevator when the axis of the pivot shaft 64 is aligned with the axis of the main airfoil. So long as the main airfoil remains in a zero or neutral position, adjustment of the differential mechanism will not displace the auxiliary airfoils but will condition the mechanism for some predetermined movement of the auxiliary airfoils which may be the same as, greater, or less than that of the main airfoil. It will be understood, of course, that it is not necessary that the main airfoil occupy a neutral position when the control mechanism is adjusted. In such case the resultant movement of the pivot shaft 64 angularly spreads or closes the links 65 and 67, the former if the rate of movement of the auxiliary airfoils is to be increased and the latter if such movement is to be reduced. Any adjustment of the pivot shaft 64 to move the link 65 toward radial alignment with the link 67 causes the latter to elevate the auxiliary airfoil 19 while any adjustment of the pivot shaft to move the link 65 away from alignment with the link 67 causes the latter to lower the auxiliary airfoil, the connecting rod 70 pivoting on the pin 71 to permit the links 65 and 67 to separate and close in the manner described. In this connection it will be noted that for any zero, or neutral, position of the main airfoil and the auxiliary airfoils, the axes of the pivot pins 68 and 76 will be aligned with the axis of the shaft 61, while for a setting which will prevent relative movement between the main airfoil and auxiliary airfoils the axis of the pivot shaft 64 will, as noted, be in alignment with the axis of the main airfoil.

Referring to Figure 3, it will be noted that the auxiliary airfoils 19 and 20 are trimmed as may be desired by adjusting the length of the links which connect the crank arms 42 and 45 to the arms of the respective auxiliary airfoils. Hence any automatic control of the auxiliary airfoils in response to the movement of the main airfoil will be imposed on, or added to, such trimming adjustment. The trim setting will, therefore, be maintained for all positions of the main airfoil.

The control mechanism described has the advantage that it is positive and dependable in operation and is operative to effect any desired differential movement between the main airfoil and the auxiliary airfoils, or to cause the main airfoil and auxiliary airfoils to move at the same rate without relative angular displacement between them. In this connection it will be understood, of course, that, although the differential control mechanism is illustrated and described in connection with the nose elevator of a particular type of airplane, this is for purposes of illustration only. The features of the invention may also be availed of to equal advantage in connection with the control surfaces, not necessarily elevators, of other types of airplanes, the control mechanism being adaptable to any control surface having main and auxiliary airfoils and wherein it is desired that the auxiliary airfoil, or airfoils, at certain times, move at a different rate than the main airfoil.

We claim as our invention:

1. Mechanism responsive to the movement of the main airfoil of a control surface also having an auxiliary airfoil, said mechanism being adapted to control relative movement between said main and auxiliary airfoils and including a pivot, cooperating links which are pivotally connected together at one end and one of which is pivotally connected at the opposite end to said pivot and the other of which is connected at the opposite end to said auxiliary airfoil, means connecting said main airfoil to said links, whereby the movement of said main airfoil is transmitted to said auxiliary airfoil, and means for pivotally adjusting the position of said pivot to vary the response of said auxiliary airfoil with respect to a predetermined movement of said main airfoil.

2. Mechanism responsive to the movement of the main airfoil of a control surface also having an auxiliary airfoil, the main airfoil being movable about a predetermined axis, said mechanism being adapted to control relative movement between said main and auxiliary airfoils and including a torque tube which is coaxial with the axis of said main airfoil and which is connected to said auxiliary airfoil, a link which is connected at one end to said torque tube, the other end of which is movable along a predetermined path to turn said torque tube and thereby move said auxiliary airfoil, means connecting said main airfoil and said other end of said link, whereby the movement of said main airfoil is transmitted to said auxiliary airfoil, and controllable means operatively connected to said other end of said link for adjusting the predetermined path of movement thereof to vary the response of said auxiliary airfoil with respect to a predetermined movement of said main airfoil.

3. Mechanism responsive to the movement of the main airfoil of a control surface also having an auxiliary airfoil, the main airfoil being movable about a predetermined axis, said mechanism being adapted to control relative movement between said main and auxiliary airfoils and including a torque tube which is coaxial with the axis of said main airfoil and which is connected to said auxiliary airfoil, a pivot, cooperating links connected together at one end, the other end of one of said links being connected to said torque tube and the other end of the other of said links being connected to said pivot, means connecting said links to said main airfoil, whereby when the latter is moved it causes said links to swing about said pivot and thereby move said auxiliary airfoil, and means for adjusting the position of said pivot to vary the response of said auxiliary airfoil with respect to a predetermined movement of said main airfoil, said links being movable relatively to permit adjustment of said pivot for the purpose described.

4. Mechanism responsive to the movement of the main airfoil of a control surface also having an auxiliary airfoil, the main airfoil being movable about a predetermined axis, said mechanism being adapted to control relative movement between said main and auxiliary airfoils and including a torque tube which is coaxial with the axis of said main airfoil, cranks carried by said torque tube, means connecting one of said cranks to said auxiliary airfoil, a pivot, cooperating links connected together at one end, the other end of one of said links being connected to the other of said cranks and the other end of the other of said links being connected to said pivot, means connecting said links to said main airfoil, whereby when the latter is moved it causes said links to swing about said pivot to rotate said torque tube and thereby move said auxiliary airfoil, and means for adjusting the position of said pivot to vary the response of said auxiliary airfoil with respect to a predetermined movement of said main airfoil, said links being movable relatively to permit adjustment of said pivot for the purpose described.

5. Mechanism responsive to the movement of the main airfoil of a control surface also having an auxiliary airfoil, the main airfoil being movable about a predetermined axis, said mechanism being adapted to control relative movement between said main and auxiliary airfoils and including a torque tube which is coaxial with the axis of said main airfoil, cranks carried by said torque tube, means connecting one of said cranks to said auxiliary airfoil, a pivotally mounted member, one end of which carries a pivot, cooperating links connected together at one end, the other end of one of said links being connected to the other of said cranks and the other end of the other of said links being connected to said pivot, means connecting said links to said main airfoil, whereby when the latter is moved it causes said links to swing about said pivot and thereby rotate said torque tube to move said auxiliary airfoil, and means for angularly adjusting said member to change the position of said pivot and thereby vary the response of said auxiliary airfoil with respect to a predetermined movement of said main airfoil, said links being relatively movable to permit said member to be adjusted for the purpose described.

6. Mechanism responsive to the movement of the main airfoil of a control surface also having an auxiliary airfoil, said mechanism being disposed in operative relation between the main and auxiliary airfoils to control relative movement between said main and auxiliary airfoils and including a link means pivotally connected to said auxiliary airfoil and angularly movable about a predetermined axis to move said auxiliary airfoil, crank means operatively connecting said main airfoil and said link means, whereby movement of said main airfoil is transmitted to said auxiliary airfoil, means for adjusting the position of said axis to vary the response of said auxiliary airfoil with respect to a predetermined movement of said main airfoil, and means independent of said last named means for adjusting the angular position of said auxiliary airfoil with respect to said main airfoil.

7. Mechanism responsive to the movement of the main airfoil of a control surface also having an auxiliary airfoil, the main airfoil being movable about a predetermined axis, said mechanism being adapted to control relative movement between said main and auxiliary airfoils and including a torque tube which is coaxial with the axis of said main airfoil and which is connected to said auxiliary airfoil, a pivot, linkage means for connecting said torque tube and said pivot and which is movable about the latter to turn said torque tube and thereby move said auxiliary airfoil, means connecting said main airfoil and said linkage means, whereby the movement of said main airfoil is transmitted to said auxiliary airfoil, means for adjusting the position of said pivot to vary the response of said auxiliary airfoil with respect to a predetermined movement of said main airfoil, and means independent of said last named means for adjusting said auxiliary airfoil with respect to said main airfoil.

8. Mechanism responsive to the movement of the main airfoil of a control surface also having an auxiliary airfoil, the main airfoil being movable about a predetermined axis, said mechanism being adapted to control relative movement between said main and auxiliary airfoils and including a torque tube which is coaxial with the axis of said main airfoil and which is connected to said auxiliary airfoil, a pivot, cooperating links pivotally connected together at one end, the other end of one of said links being connected to said pivot and the other end of the other of said links being connected to said torque tube, means connecting said links to said main airfoil, whereby the movement of the latter causes said links to swing about said pivot and thereby rotate said torque tube to move said auxiliary airfoil, means for adjusting the position of said pivot to vary the response of said auxiliary airfoil with respect to a predetermined movement of said main airfoil, and means independent of said last named means for adjusting said auxiliary airfoil with respect to said main airfoil.

9. Mechanism responsive to the movement of the main airfoil of a control surface also having auxiliary airfoils, the main airfoil being movable about a predetermined axis, said mechanism being adapted to control relative movement between said main and auxiliary airfoils and including aligned, spaced-apart torque tubes which are coaxial with the axis of said main airfoil, first and second cranks on each of said torque tubes, means for connecting said first crank on each of said torque tubes to an auxiliary airfoil, a pivotally mounted member for providing pivots, cooperating pairs of links, the links of said pairs being pivotally connected together at one end and the other end of one link of each of said pairs being connected to one of said pivots and the other end of the other link of each of said pairs being connected to said second one of said cranks, means connecting said main airfoil to said pairs of links, whereby when said main airfoil moves it causes said pairs of links to swing about said pivots to turn said torque tubes and thereby cause said auxiliary airfoils to move simultaneously, and means for angularly adjusting said pivotally mounted member to change the position of said pivots and thereby vary the response of said auxiliary airfoils with respect to a predetermined movement of said main airfoil, the links of each of said pairs being relatively movable to permit said member to be angularly adjusted for the purpose described.

10. Mechanism responsive to the pivotal movement of the main airfoil of a control surface also having an auxiliary airfoil, the main airfoil having a predetermined pivot axis, said mechanism being adapted to control relative movement between said main and auxiliary airfoils and including a rockable member having a pivot thereon which is movable from a position of coincidence with said pivot axis, a link mounted on said pivot, a second link connecting said first mentioned link with the main airfoil for pivoting said latter link about said pivot, means operatively interconnecting the auxiliary airfoil with said first mentioned link whereby said auxiliary airfoil is moved in response to movement of the main airfoil, and means for rocking said rockable member to control the relative movement between the main and auxiliary airfoils by moving said pivot from its position of coincidence with said pivot axis.

JOHN NOYES, Jr.
MYRON L. DAGGETT, Jr.